(12) United States Patent
Moran et al.

(10) Patent No.: US 10,207,807 B2
(45) Date of Patent: Feb. 19, 2019

(54) CONDENSATE REMOVAL SYSTEM OF AN AIRCRAFT COOLING SYSTEM

(71) Applicant: THE BOEING COMPANY, Chicago, IL (US)

(72) Inventors: Thomas Joseph Moran, Lake Stevens, WA (US); David Andrew Lutz, Summerville, SC (US)

(73) Assignee: The Boeing Company, Chicago, IL (US)

( * ) Notice: Subject to any disclaimer, the term of this patent is extended or adjusted under 35 U.S.C. 154(b) by 322 days.

(21) Appl. No.: 15/097,391

(22) Filed: Apr. 13, 2016

(65) Prior Publication Data

US 2017/0297716 A1    Oct. 19, 2017

(51) Int. Cl.
| | | |
|---|---|---|
| *B64C 11/04* | (2006.01) | |
| *B64D 11/04* | (2006.01) | |
| *F24F 13/22* | (2006.01) | |
| *B64D 13/08* | (2006.01) | |

(52) U.S. Cl.
CPC ............. *B64D 11/04* (2013.01); *B64D 13/08* (2013.01); *F24F 13/222* (2013.01); *F24F 2013/225* (2013.01)

(58) Field of Classification Search
CPC ..... B64D 11/04; B64D 11/0007; B64D 11/00; B64D 13/08; B64D 2013/0629; B64D 13/06; F24F 13/222; F24F 2013/227; F24F 2013/225; F24F 2013/228; F24F 2110/20
See application file for complete search history.

(56) References Cited

U.S. PATENT DOCUMENTS

| | | | | |
|---|---|---|---|---|
| 3,872,688 A | | 3/1975 | Tillman | |
| 4,180,986 A | * | 1/1980 | Shaw | F04C 28/06 418/84 |
| 4,275,570 A | * | 6/1981 | Szymaszek | F25B 43/02 62/468 |
| 4,912,937 A | * | 4/1990 | Nakamura | F24F 1/022 62/160 |
| 5,199,271 A | * | 4/1993 | Ewer | B64D 13/06 62/157 |

(Continued)

FOREIGN PATENT DOCUMENTS

| | | |
|---|---|---|
| DE | 102010034830 A1 | 2/2012 |
| EP | 2078908 A2 | 7/2009 |
| EP | 2933190 A1 | 10/2015 |

OTHER PUBLICATIONS

Extended European Search Report for corresponding EP Application No. 17165841.2-1754 dated Aug. 14, 2017 (7 pages).

(Continued)

*Primary Examiner* — Assres H Woldemaryam
(74) *Attorney, Agent, or Firm* — Jay J. Hoette; The Small Patent Law Group, LLC

(57) ABSTRACT

An aircraft includes a cooling compartment and an evaporative chiller configured to cool the cooling compartment. The evaporative chiller includes a compressor, an evaporator having airflow to the cooling compartment, and a condenser. The condenser has an exhaust airflow to cool the condenser. The evaporative chiller has a condensate removal system removing condensate produced by the evaporator using the exhaust airflow of the condenser to discharge the condensate.

19 Claims, 5 Drawing Sheets

(56) References Cited

U.S. PATENT DOCUMENTS

| | | | | |
|---|---|---|---|---|
| 5,215,441 | A * | 6/1993 | Evans | F01D 5/16 |
| | | | | 416/223 R |
| 5,699,673 | A * | 12/1997 | Hoshino | B01D 53/265 |
| | | | | 62/272 |
| 6,085,539 | A * | 7/2000 | Meyer | F24F 1/42 |
| | | | | 62/280 |
| 6,116,046 | A * | 9/2000 | Leaver | F04C 28/28 |
| | | | | 62/192 |
| 7,523,622 | B2 | 4/2009 | Zywaik et al. | |
| 9,022,364 | B2 | 5/2015 | Sundine | |
| 9,062,909 | B2 | 6/2015 | Lu et al. | |
| 2005/0034477 | A1 * | 2/2005 | Hu | B64D 13/00 |
| | | | | 62/435 |
| 2005/0210910 | A1 | 9/2005 | Rigney et al. | |
| 2013/0160472 | A1 * | 6/2013 | Klimpel | B64D 13/08 |
| | | | | 62/87 |
| 2013/0247600 | A1 * | 9/2013 | Lu | B64D 13/08 |
| | | | | 62/89 |
| 2013/0344789 | A1 | 12/2013 | Lee et al. | |
| 2014/0326005 | A1 | 11/2014 | Zywiak et al. | |
| 2014/0367070 | A1 | 12/2014 | Burd | |
| 2015/0266353 | A1 * | 9/2015 | Lu | B64D 11/04 |
| | | | | 62/89 |
| 2015/0313356 | A1 | 11/2015 | Burgess et al. | |
| 2016/0338488 | A1 * | 11/2016 | Garcia | B64D 11/0007 |

OTHER PUBLICATIONS

Extended European Search Report for corresponding EP Application No. 171656063.9 dated Sep. 27, 2017 (8 pages).

\* cited by examiner

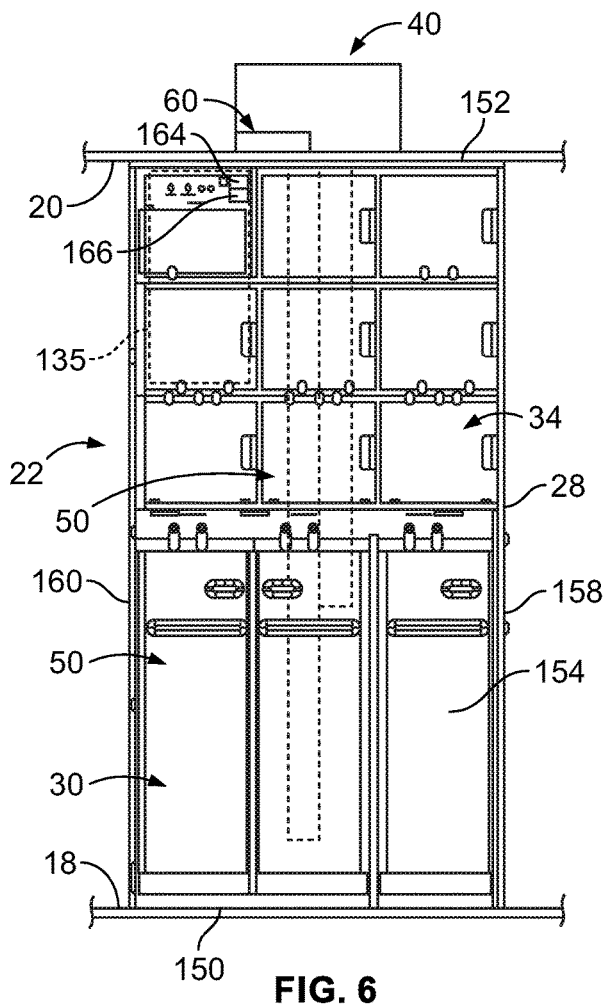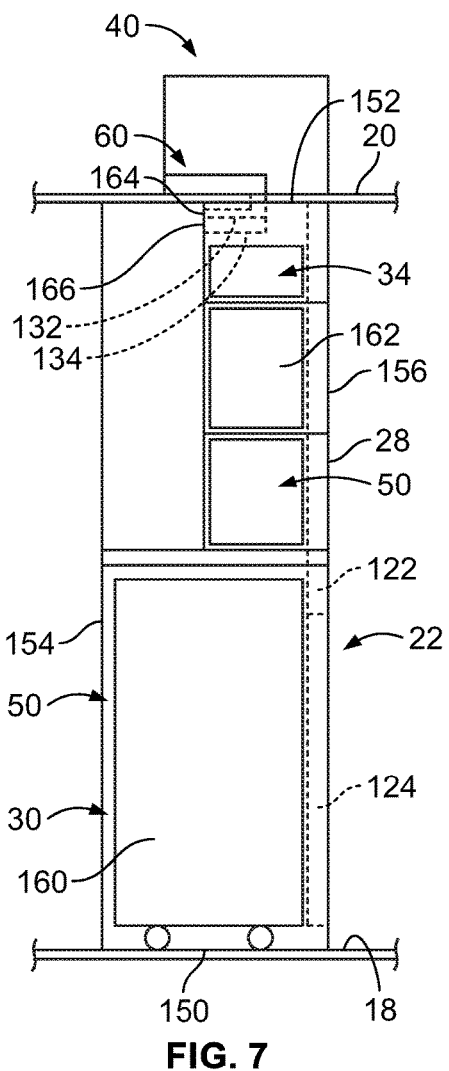

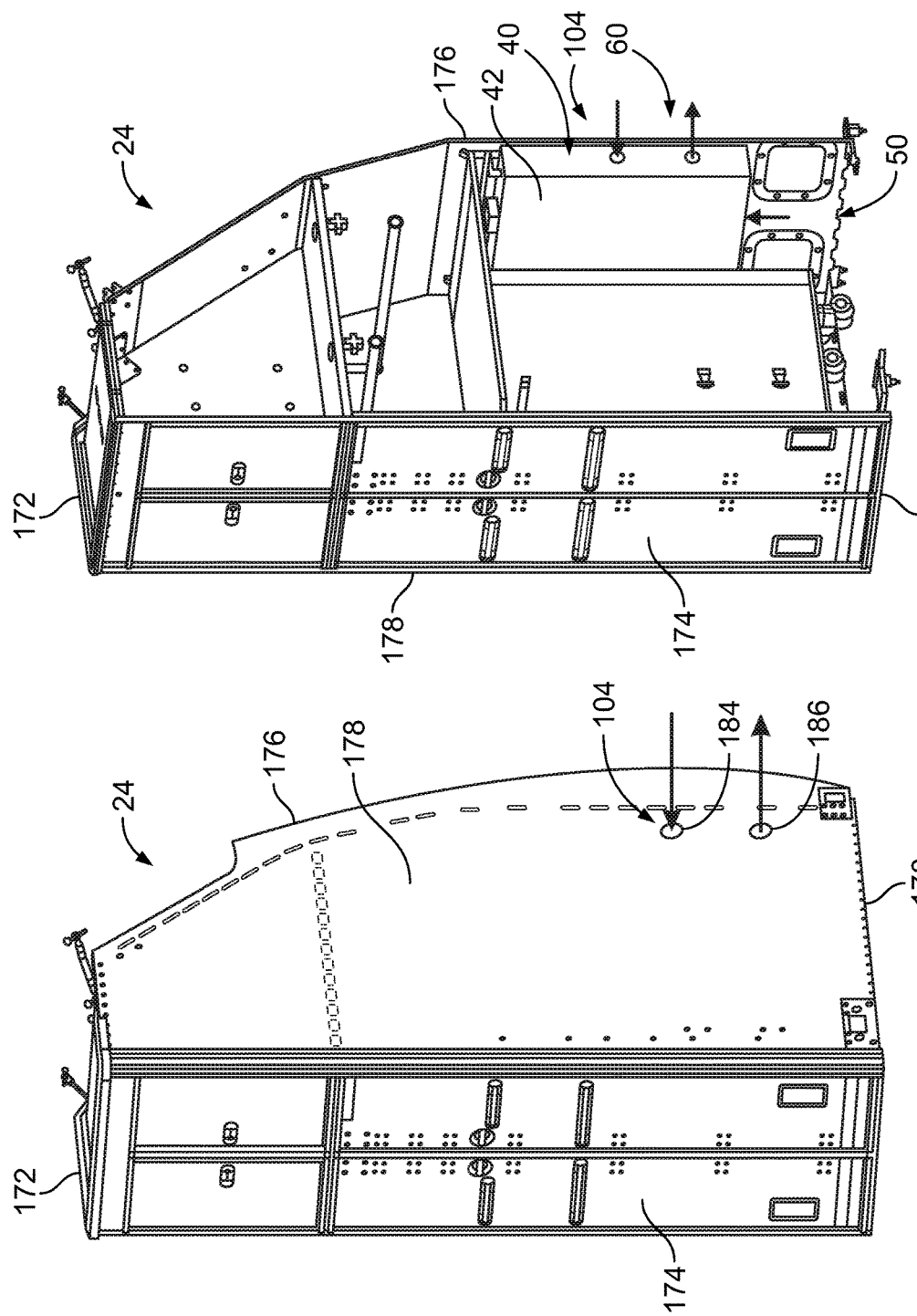

CONDENSATE REMOVAL SYSTEM OF AN AIRCRAFT COOLING SYSTEM

BACKGROUND

The present disclosure relates generally to systems and methods of condensate removal from an aircraft cooling system.

Aircraft can include multiple galleys to store food and beverages on the aircraft. The food and beverages are typically stored in galley carts which are transported to the aircraft and stored in refrigerated compartments or zones in the galleys. A refrigeration system is provided to supply cooled air to the cooling compartments. The refrigeration system includes an evaporator that creates condensate during use. The galleys include a drainage system to drain the condensate from the refrigeration system. For example, the drainage system includes plumbing, such as pipes and valves, for controlling the drainage. Some systems use electrically controlled valves requiring a wire harness and control electronics and circuit breakers.

The various components of the drainage system add to the weight, cost and complexity of the refrigeration system. Additionally, the various components of the drainage system occupy valuable space in the galley, such as for routing the pipes, housing the valves and control electronics, and the like. The space occupied by the components is unavailable for storage of other items, such as stowage bins or standard containers, which may increase the overall footprint of the galley to handle all of the storage needs. Furthermore, the aircraft is limited as to where the refrigeration system may be positioned as the refrigeration system must be located in an area having access to plumbing for the drainage of the condensate.

SUMMARY

In accordance with one embodiment, an aircraft is provided including a cooling compartment and an evaporative chiller configured to cool the cooling compartment. The evaporative chiller includes a compressor, an evaporator configured to channel an airflow to the cooling compartment, and a condenser. The condenser configured to produce an exhaust airflow to cool the condenser. The evaporative chiller has a condensate removal system configured to remove condensate produced by the evaporator using the exhaust airflow of the condenser to discharge the condensate.

In accordance with another embodiment, an aircraft is provided including a galley having a plurality of stowage compartments with at least one of the stowage compartments defining a cooling compartment. The galley is plumbing-free. An evaporative chiller is coupled to the galley. The evaporative chiller is configured to cool the cooling compartment. The evaporative chiller includes a compressor, an evaporator is configured to channel an airflow to the cooling compartment for cooling the cooling compartment, and a condenser. The condenser configured to produce an exhaust airflow to cool the condenser. A condensate removal system is coupled to the plumbing-free galley. The condensate removal system includes a condensate collector configured to collect condensate produced by the evaporator. The condensate removal system includes a condensate re-ingestor configured to discharge the condensate into the exhaust airflow of the condenser such that the condensate is configured to be discharged from the evaporative chiller.

In accordance with yet another embodiment, a galley is provided including a plurality of walls extending between a crown and a floor of a cabin of an aircraft. A cooling compartment is defined by the plurality of walls. The cooling compartment is configured to receive at least one of a galley cart and a stowage container. An evaporative chiller is configured to cool the cooling compartment. The evaporative chiller includes a compressor, an evaporator configured to channel an airflow to the cooling compartment, and a condenser. The condenser configured to produce an exhaust airflow to cool the condenser. The evaporative chiller has a condensate removal system configured to remove condensate produced by the evaporator using the exhaust airflow of the condenser to discharge the condensate.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 6 is a front view of a galley of the aircraft and the refrigeration system in accordance with an exemplary embodiment.

FIG. 7 is a side cross-sectional view of the galley and refrigeration system.

FIG. 8 is a front view of a closet of the aircraft and the refrigeration system in accordance with an exemplary embodiment.

FIG. 9 is a side cross-sectional view of the closet and the refrigeration system.

DETAILED DESCRIPTION

Figure 1:
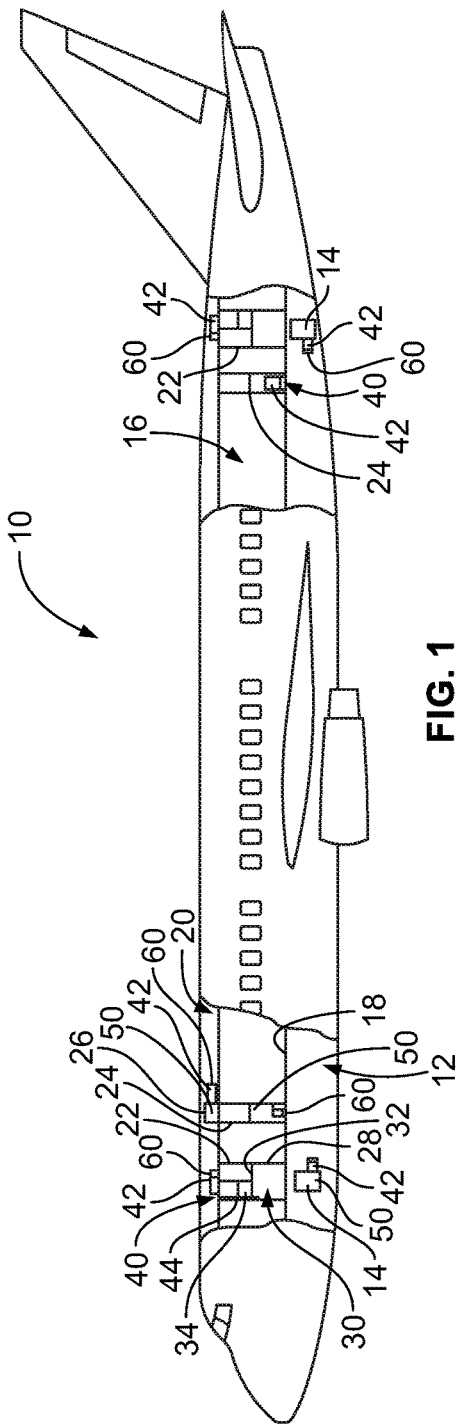
FIG. 1 is a cross-sectional schematic view of an aircraft in accordance with an exemplary embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a condensate removal system for an aircraft cooling system, such as a refrigeration system configured to supply refrigerated air to a cooling compartment. For example, the refrigeration system may be used with a galley for refrigerating galley carts or other standard containers. The refrigeration system may be used in other areas of the aircraft, such as in point-of-use cooling compartments. For example, the refrigeration system may be used in closets away from dedicated galleys, in cargo areas in the crown or below the cabin floor where carts and/or standard containers may be accessed with an elevator system, and the like. Various embodiments provide components for injecting the condensate into an exhaust airflow used with a chiller or heat exchanger. The condensate removal system is used without the need for plumbing to discharge the condensate, and as such, the chiller may be used in plumbing-free galleys or other cooling compartments without the need for plumbing. Eliminating the plumbing reduces the weight of the chiller and frees up storage space in the galley or point of use area for additional stowage or cooling compartment space. By eliminating the need for plumbing, previously unused or underutilized areas of the aircraft may be used as cooling compartments by incorporating the chiller in such area of the aircraft, as plumbing does not need to be routed to such area of the aircraft.

FIG. 1 is a cross-sectional schematic view of an aircraft 10 in accordance with an exemplary embodiment. The aircraft 10 includes a cargo area 12 within a lower portion of the aircraft 10. The cargo area 12 includes one or more cargo compartments 14. The aircraft 10 includes a cabin 16 above the cargo area 12. The cargo area 12 is separated from the cabin 16 by a floor 18. The aircraft 10 includes a crown 20 in an overhead area above the cabin 16.

The aircraft 10 includes one or more galleys 22 in the cabin 16. The aircraft 10 includes one or more closets 24 in the cabin 16. The closets 24 may be positioned near the galleys 22 or remote from the galleys 22. The galleys 22 and closets 24 define compartments of the aircraft 10 for stowage of items within the cabin 16. The aircraft 10 may include one or more cargo compartments 26 in the crown 20. Cargo stored in the upper cargo compartments 26 or in the lower cargo compartments 14 may be accessed by an elevator system.

The galley 22 is a catering area accessible by the crew of the aircraft 10 for stowing items used to serve the passengers, such as food, beverages, and the like. The galley 22 includes a plurality of walls 28 extending between the floor 18 and the crown 20. The walls 28 define one or more cart compartments 30, which are typically arranged below a counter 32 of the galley 22, and one or more stowage compartments 34, which are typically arranged above the counter 32. The galley area is separated from the passenger area where passenger seats are located. The galley 22 has a working area for the galley crew where galley carts in the cart compartments 30, counter 32 and standard containers in the stowage compartments 34 may be accessed. Space dedicated to the galley 22 is unusable for passenger seats or other purposes such as lavatories, and thus it may be desirable for aircraft manufacturers to reduce the footprint of the galley 22 in order to increase the passenger area to increase revenue of each flight for aircraft operators. The galley 22 may include any number of cart compartments 30 and stowage compartments 34 and the aircraft 10 may include any number of galleys 22.

The galley 22 includes a refrigeration system 40 that provides cooled air for the galley 22. Components of the refrigeration system 40 may be positioned above the galley 22 (e.g., in the crown 20 of the aircraft 10), may be positioned in the galley 22, and/or may be positioned below the galley 22 (e.g., in the cargo area 12 of the aircraft 10 below the floor 18). In an exemplary embodiment, the refrigeration system 40 includes at least one liquid heat exchange loop and at least one air heat exchange loops in flow communication with the liquid heat exchange loop(s). The liquid heat exchange loop is used to supply cold liquid, which is used for heat exchange with the air heat exchange loop(s). In an exemplary embodiment, the liquid heat exchange loop includes a vapor cycle or evaporative chiller 42. The air heat exchange loop(s) includes air ducts 44 used to move airflow, such as to one or more of the cart compartments 30 and/or to one or more of the stowage compartments 34. Any compartment receiving cooled airflow from the chiller 42 is referred to as a cooling compartment 50. For example, any of the cart compartments 30 may be cooling compartments 50 if receiving cooling airflow from the chiller 42. Any of the stowage compartments 34 may be cooling compartments 50 if receiving cooling airflow from the chiller 42.

In an exemplary embodiment, the aircraft 10 includes additional cooling compartments 50 outside of the galleys 22. For example, any of the closets 24 may include cooling compartments 50 by providing a point of use evaporative chiller 42 in or near (e.g., above or below) the closet 24 or connected to the cooling compartments 50 by air ducts 44 to supply cooling airflow to the cooling compartments 50. Any of the cargo compartments 14 and/or 26 may include cooling compartments 50 by providing an evaporative chiller 42 in or near the corresponding cargo compartments 14, 26 or connected to the cooling compartments 50 by air ducts 44 to supply cooling airflow to the cooling compartments 50.

In an exemplary embodiment, the refrigeration systems, including the chillers 42, are plumbing-free. The chillers 42 have condensate removal systems 60 for removing condensate produced by the chillers 42 without the need for draining the condensate away from the chillers 42. As such, piping, valves, wire harnesses, circuit breakers for operating the valves, and the like are not necessary for removing the condensate from the chillers 42. The chillers 42 and associated condensate removal systems 60 are configured to be used in the plumbing free galleys 22. The chillers 42 and associated condensate removal systems 60 may be used at point of use locations, such as within the closets 24 and/or cargo compartments 14, 26, without the need for routing plumbing to such point of use locations. Eliminating plumbing for draining condensate from the chillers 42 reduces the weight of the aircraft 10. Eliminating plumbing for draining condensate from the chillers 42 reduces the cost of the refrigeration system. Eliminating plumbing for draining condensate from the chillers 42 provides more space, such as within the galley 22, the closet 24, and/or the cargo compartments 14, 26 for stowing items such as galley carts, standard containers, and the like.

Figure 2:
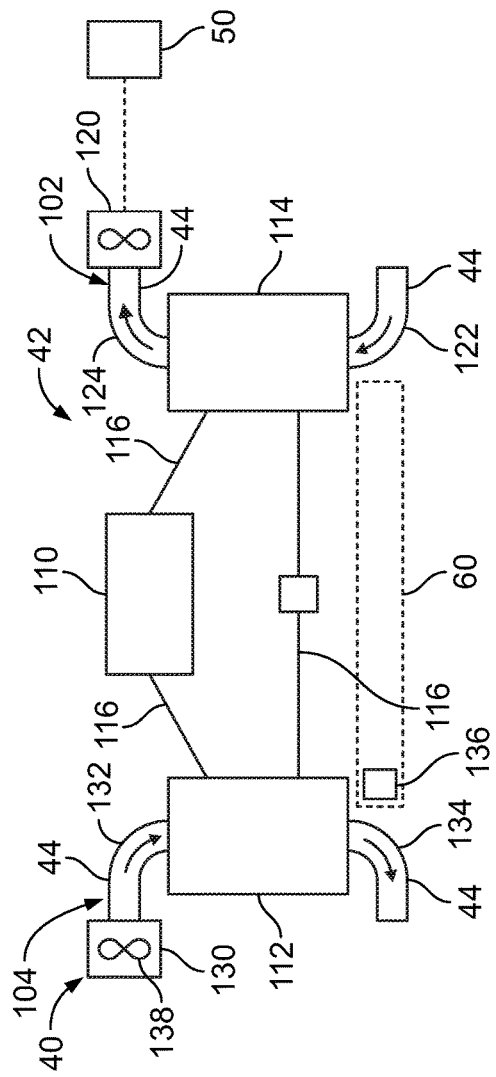
FIG. 2 is a schematic illustration of a refrigeration system of the aircraft in accordance with an exemplary embodiment.

FIG. 2 is a schematic illustration of the refrigeration system 40 of the aircraft 10. The refrigeration system 40 includes the chiller 42 and the condensate removal system 60. The refrigeration system 40 includes a chilled air circuit 102 for supplying cooled airflow to the cooling compartment 50. The refrigeration system 40 includes a condenser air circuit 104 for cooling one or more components of the refrigeration system 40. The air circuits 102, 104 use various air ducts 44 to channel airflow.

The refrigeration system 40 uses a refrigeration cycle to supply the chilled airflow to the cooling compartment 50. The chiller 42 of the refrigeration system 40 includes a compressor 110, a condenser 112, and an evaporator 114. Refrigerant lines 116 are provided between the compressor 110, the condenser 112 and the evaporator 114 to transfer refrigerant through the chiller 42. The refrigerant undergoes temperature changes in the compressor 110, the condenser 112, and the evaporator 114 when the chiller 42 is operated. The refrigerant undergoes phase changes in the evaporator 114 and in the condenser 112 when the chiller 42 is operated. The chiller 42 transfers heat between the refrigerant and the airflow.

During operation of the chiller 42, the compressor 110 is operated to propel the refrigerant through the refrigerant lines 116. The refrigerant enters the compressor 110 as a vapor. The vapor is compressed by the compressor 110 and exits the compressor 110 superheated. The superheated vapor travels through the condenser 112, which cools and removes the superheat and then condenses the vapor into a liquid. The liquid refrigerant may pass through an expansion valve between the condenser and the evaporator to decrease the pressure of the refrigerant, which results in a mixture of liquid and vapor at a lower temperature and pressure. The cold liquid-vapor mixture travels through the evaporator 114, where the refrigerant is vaporized during cooling of the warm air of the chilled air circuit 102. The vapor refrigerant then returns to the compressor 110. The chiller 42 may include other components, such as heat exchangers, expansion valves, bypass valves, and the like for operating the chiller 42.

The chilled air circuit 102 includes a blower 120 for moving the airflow through the air ducts 44 of the chilled air circuit 102. In an exemplary embodiment, the chilled air circuit 102 includes an air supply duct 122 and an air return duct 124. The air return duct 124 is upstream of the evaporator 114 and the air supply duct 122 is downstream of the evaporator 114. The air return duct 124 brings an airflow to the evaporator 114. The air flowing over the evaporator 114 is cooled and the cooled airflow is directed through the air supply duct 122 to the cooling compartment 50, such as for cooling the galley carts or standard containers. The chilled air circuit 102 may include other components, such as filters, bypass ducts, vents and the like for controlling airflow through the chilled air circuit 102.

The condenser air circuit 104 includes a condenser fan 130 promoting airflow through the condenser air circuit 104. In an exemplary embodiment, the condenser air circuit 104 includes a condenser supply duct 132 and a condenser exhaust duct 134. The condenser supply duct 132 is upstream of the condenser 112 and the condenser exhaust duct 134 is downstream of the condenser 112. The condenser supply duct 132 brings airflow to the condenser 112 for cooling the condenser 112. The air flowing over the condenser 112 is used to cool the condenser 112 and the refrigerant flowing through the condenser 112, which causes the airflow to be heated. The heated exhaust airflow is directed through the condenser exhaust duct 134 and may be expelled from the chiller 42. The exhaust air may be discharged to a predetermined location within the aircraft 10. For example, the exhaust air may be discharged into the cabin 16 of the aircraft 10. The exhaust air may be discharged into a compartment, such as the upper cargo compartment 26 or the lower cargo compartment 14 of the aircraft 10. The condenser air circuit 104 may include other components, such as filters, bypass ducts, vents and the like for controlling airflow through the condenser air circuit 104.

During operation of the chiller 42, condensate may be generated by the evaporator 114. Conventional refrigeration systems collect and discharge the condensate through a drainage system that utilizes plumbing to remove the condensate. For example, a sump may collect the condensate and the condensate may be drained from the sump through a series of pipes and the use of a gray water interface valve. The gray water interface valve is electrically controlled and is connected to a control panel by a wire harness. The control panel may include various circuit breakers and other electrical components for controlling the gray water interface valve. The pipes, valves, wire harnesses, circuit breakers and other components of the condensate drainage system of conventional refrigeration systems add weight and cost to the refrigeration system and occupy valuable space in the aircraft 10, such as in the galley 22. For example, FIG. 6 illustrates an area 135 typically occupied by the drainage system, such as the grey water interface valve, pipes and control panel, but which is shown with standard containers in FIG. 6 because the galley uses the condensate removal system 60 rather than the drainage system.

In various embodiments, the condensate removal system 60 eliminates some or all of the plumbing components used in conventional refrigeration systems. As such, the chiller 42 with the condensate removal system 60 has reduced weight and reduced cost as compared to conventional refrigeration systems. The chiller 42 with the condensate removal system 60 occupies less space than conventional refrigeration systems and may be positioned within the aircraft 10 in areas that conventional refrigeration systems cannot be located due to conventional refrigeration systems need for plumbing. For example, the chiller 42 with the condensate removal system 60 may be used in plumbing-free galleys 22, in closets 24 that do not include plumbing, and/or in cargo compartments 14, 26 that do not include plumbing.

In an exemplary embodiment, the condensate removal system 60 removes condensate produced by the evaporator 114 using the exhaust airflow of the second air circuit 104 associated with the condenser 112 to discharge the condensate. For example, the condensate removal system 60 injects the condensate into the exhaust airflow such that the condensate is discharged through the condensate exhaust duct 134. The condensate is injected into the heated exhaust airflow and is expelled by the condenser fan 130. The moist, heated exhaust airflow may be directed to a predetermined location of the aircraft 10, such as in the cabin 16, the crown 20, the cargo area 14 or elsewhere. The moist, heated exhaust airflow may be expelled from the aircraft 10.

In an exemplary embodiment, the condensate removal system 60 includes a condensate re-ingestor 136 used to discharge the condensate into the exhaust airflow of the condenser 112 to discharge the condensate from the chiller 42. In various embodiments, the condensate re-ingestor 136 is an atomizer nozzle and the condensate is injected into the exhaust airflow using the atomizer nozzle configured to spray the condensate into the exhaust airflow. In other various embodiments, the condensate re-ingestor 136 is a sponge and the condensate is collected in the sponge and the heated exhaust airflow passing over the sponge evaporates the condensate such that the condensate is injected into the exhaust airflow and expelled from the chiller 42 through the condenser exhaust duct 134. In other various embodiments, the condensate re-ingestor 136 is defined by the condenser fan 130. The condenser fan 130 includes fan blades 138 dipped into a condensate collector that holds the condensate such that as the blades 138 are rotated, droplets of the condensate are propelled away from the blades 138 and injected into the exhaust airflow.

Figure 3:
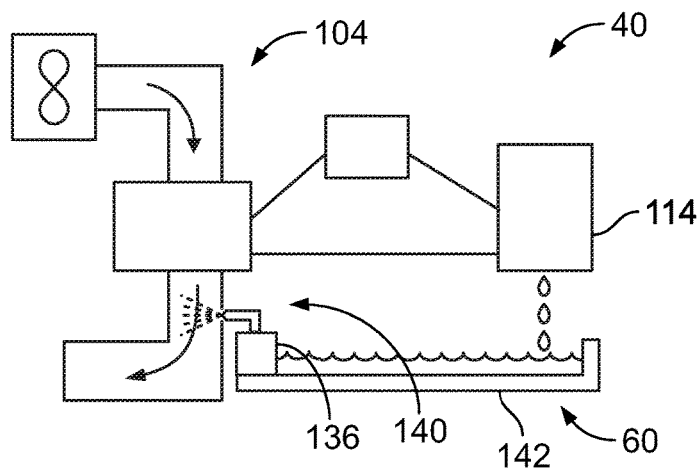
FIG. 3 is a schematic illustration of a portion of the refrigeration system showing a condensate removal system and a condenser air circuit in accordance with an exemplary embodiment.

FIG. 3 is a schematic illustration of a portion of the refrigeration system 40 showing the condensate removal system 60 and condenser air circuit 104. The condensate re-ingestor 136 is shown in FIG. 3. The condensate re-ingestor 136, in the illustrated embodiment, includes an atomizer nozzle 140 configured to spray the condensate into the exhaust airflow downstream of the condenser fan 130. The condensate removal system 60 includes a condensate collector 140, such as a drip pan or sump, under the evaporator 114 that collects the condensate. The atomizer nozzle 140 receives the condensate from the condensate collector 140 and sprays the condensate into the exhaust airflow. In other various embodiments, the condensate re-ingestor 136 may drip the condensate into the exhaust airflow rather than spraying the condensate into the exhaust airflow.

Figure 4:
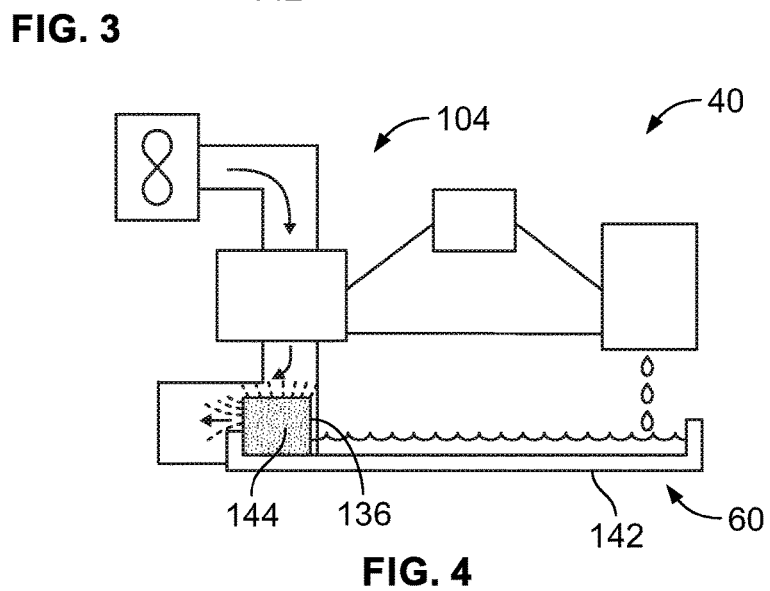
FIG. 4 is a schematic illustration of a portion of the refrigeration system showing a condensate removal system and a condenser air circuit in accordance with an exemplary embodiment.

FIG. 4 is a schematic illustration of a portion of the refrigeration system 40 showing the condensate removal system 60 and condenser air circuit 104. The condensate re-ingestor 136 is shown in FIG. 4. The condensate re-ingestor 136, in the illustrated embodiment, includes a sponge 144 in the condensate collector 142. The sponge 144 absorbs the condensate. As the heated airflow passes over or through the sponge, the absorbed condensate is evaporated into the exhaust airflow.

Figure 5:
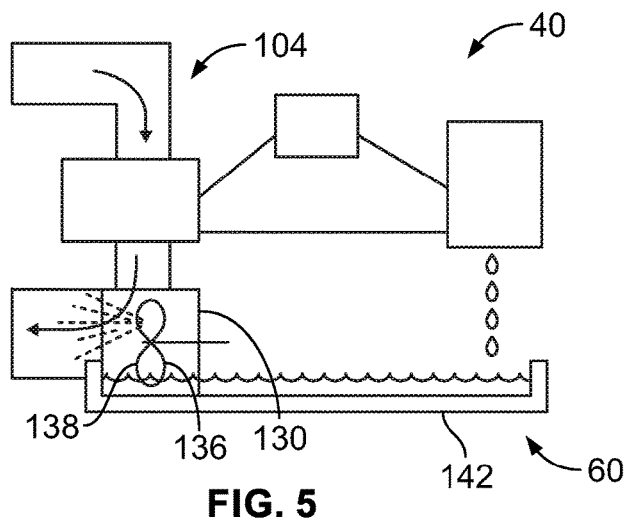
FIG. 5 is a schematic illustration of a portion of the refrigeration system showing a condensate removal system and a condenser air circuit in accordance with an exemplary embodiment.

FIG. 5 is a schematic illustration of a portion of the refrigeration system 40 showing the condensate removal system 60 and condenser air circuit 104. The condensate re-ingestor 136 is shown in FIG. 5. The condensate re-ingestor 136, in the illustrated embodiment, is defined by the blades 138 of the condenser fan 130. The condensate collector 142 is positioned relative to the condenser fan 130 such that the blades 138 are dipped into the condensate contained in the condensate collector 142. Droplets of the condensate are gathered on the blades 138 as the blades 138 rotate through the condensate. The droplets are propelled (e.g., flicked off of) from the blades 138 into the exhaust airflow.

FIG. 6 is a front view of the galley 22 and refrigeration system 40 in accordance with an exemplary embodiment. FIG. 7 is a side cross-sectional view of the galley 22 and refrigeration system 40 in accordance with an exemplary embodiment. The walls 28 of the galley 22 define a bottom 150, which may be at the floor 18, a top 152, a front 154, a rear 156 (FIG. 7) opposite the front 154, and sides 158 (FIG. 6). The rear 156 may be fore or aft facing, depending on the orientation of the galley 22 within the cabin 16. The rear 156 may face the passenger area (e.g., passenger seats may be located behind the rear 156, in front of the rear 156, and the like); however in alternative embodiments, the rear 156 may be positioned against a bulkhead.

In an exemplary embodiment, the refrigeration system 40 is positioned at the top 152 and along the rear 156; however the components of the refrigeration system 40 may be positioned at other locations in alternative embodiments. The components of the refrigeration system 40 extend into the cooling compartments 50 defined by the cart compartment 30 to interface with galley carts 160 to supply cool air to the galley carts 160 in an air-through-cart supply arrangement or an air-over-cart supply arrangement. The components of the refrigeration system 40 extend into the cooling compartments 50 defined by the stowage compartments 34 to supply cool air to standard containers 162. In the illustrated embodiment, the air supply and return ducts 122, 124 (shown in phantom) are routed through the galley 22 at the rear 156.

In an exemplary embodiment, the galley 22 includes a condenser air intake vent 164 and a condenser air exhaust vent 166. The condenser air intake vent 164 is connected to the condenser supply duct 132. The condenser air exhaust vent 166 is connected to the condenser exhaust duct 134. The exhaust air with the condensate removed by the condensate removal system 60 and injected into the exhaust air by the condensate removal system 60 is exhausted through the condenser air exhaust vent 166. In the illustrated embodiment, the intake and exhaust vents 164, 166 are provided on the front face of the galley 22; however the intake vent 164 and/or the exhaust vent 166 may be provided elsewhere, such as on the rear face of the galley 22, on a wall 28 into one of the stowage compartments 34, on the crown 20 or elsewhere. The supply and exhaust ducts 132, 134 may extend along the rear 156, such as to the bottom 150, with the intake and exhaust vents 164, 166 at the floor 18 to exhaust the exhaust air and condensate into the cargo area 12.

FIG. 8 is a front view of the closet 24 and refrigeration system 40 in accordance with an exemplary embodiment. FIG. 9 is a side cross-sectional view of the closet 24 and refrigeration system 40 in accordance with an exemplary embodiment. The closet 24 is typically used for storage of non-catering items such as passenger luggage, passenger coats, and the like. However, in some various embodiments, to increase the number of catering items (e.g., food or beverages) on a flight, it may be desirable to convert or retrofit closets 24 to include cooling compartments 50. The closets 24 are typically plumbing-free. Providing the chiller 42 with the condensate removal system 60 in the closet 24 is possible as plumbing is not needed to discharge the condensate because the condensate is injected into the condenser air circuit 104 and discharged through the exhaust airflow.

In the illustrated embodiment, the closet 24 includes a bottom 170, a top 172, a front 174, a rear 176 (FIG. 9), and sides 178 (FIG. 8). The closet 24 may be oriented such that the rear 176 faces the exterior of the aircraft 10. The closet 24 may be deep from front-to-rear, with more space at the bottom 170 than at the top 172 due to the curved shape of the fuselage of the aircraft 10. The bottom-rear portion of the closet 24 may typically be less used space due to it being difficult to reach to stow luggage or coats. Such space may be configured to receive the chiller 42 and other components of the refrigeration system 40. For example, the chiller 42 may be provided at the rear 176 at or near the bottom 170. Other orientations and locations of the chiller 42 are possible in alternative embodiments. The cooling compartment 50 may be provided along the bottom 170, leaving un-cooled stowage compartments above the cooling compartment 50, such as for luggage or coats.

A condenser air intake vent 184 (FIG. 8) and a condenser air exhaust vent 186 (FIG. 8) may be provided in one of the walls of the closet 24 or in the floor 19. The exhaust air with the condensate removed by the condensate removal system 60 and injected into the exhaust air by the condensate removal system 60, is exhausted through the condenser air exhaust vent 186.

Figure 10:
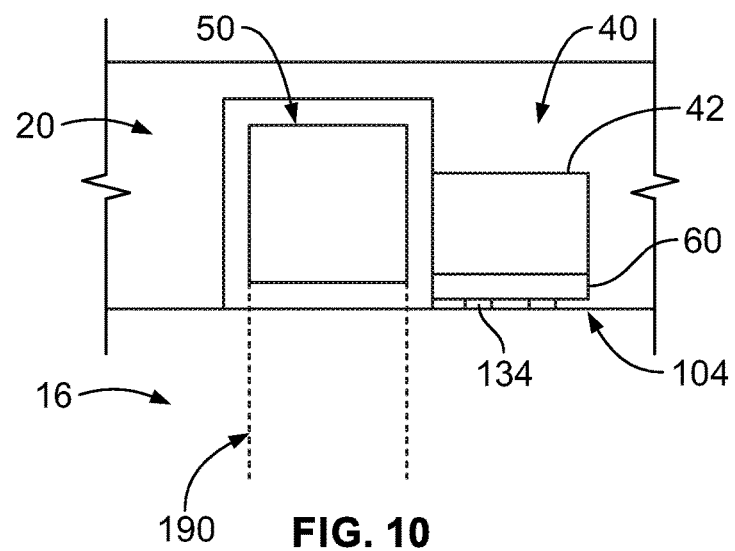
FIG. 10 is a schematic illustration of the refrigeration system and a cooling compartment in accordance with an exemplary embodiment.

FIG. 10 is a schematic illustration of the refrigeration system 40 and the cooling compartment 50 in the crown 20. The cooling compartment 50 may receive standard containers, carts or other items requiring cooling. The items in the cooling compartment 50 may be accessed by an elevator system 190 used to bring the items to the cabin 16. The chiller 42, with the condensate removal system 60, is positioned near the cooling compartment 50 and is devoid of plumbing for draining condensate, as the condensate is injected into the condenser air circuit 104 and discharged through the exhaust airflow. The condenser exhaust duct 134 may exhaust the exhaust airflow to a predetermined location, such as into the cabin 16 or into the crown 20. The condenser exhaust duct 134 may tie into the cabin airflow system to discharge the exhaust airflow, with the condensate, into the cabin airflow system.

Figure 11:
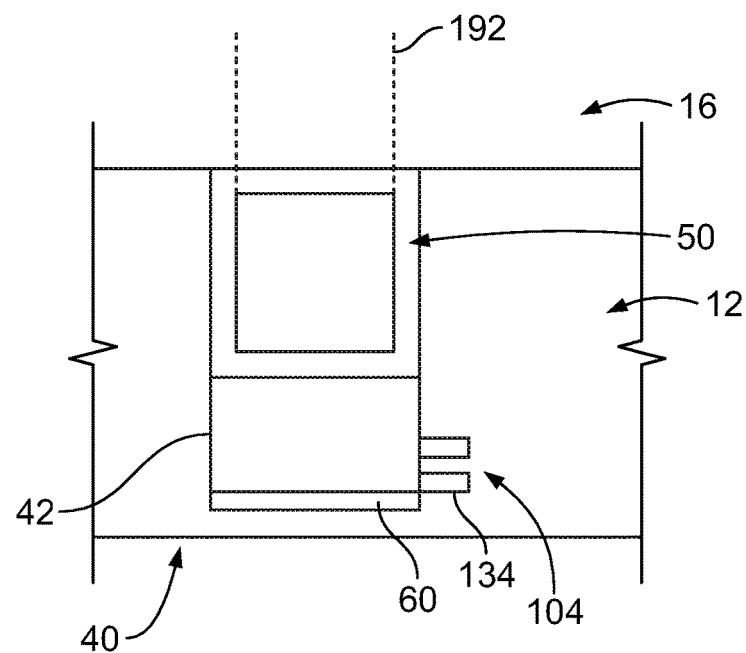
FIG. 11 is a schematic illustration of the refrigeration system and a cooling compartment in accordance with an exemplary embodiment.

FIG. 11 is a schematic illustration of the refrigeration system 40 and the cooling compartment 50 in the cargo area 12. The cooling compartment 50 may receive standard containers, carts or other items requiring cooling. The items in the cooling compartment 50 may be accessed by an elevator system 192 used to bring the items to the cabin 16. The chiller 42, with the condensate removal system 60, is positioned near the cooling compartment 50 and is devoid of plumbing for draining condensate, as the condensate is injected into the condenser air circuit 104 and discharged through the exhaust airflow. The condenser exhaust duct 134 may exhaust the exhaust airflow to a predetermined location, such as into the cabin 16 or into the cargo area 12.

A condensate removal system for a refrigeration system of an aircraft is provided to discharge the condensate into the condenser exhaust airflow. The refrigeration system is thus useable without a condensate drainage system of pipes, valves, wire harnesses, control electronics, circuit breakers, and the like. The condensate removal system lowers the weight and the cost of the refrigeration system. The condensate removal system allows positioning of the refrigeration system in areas of the aircraft previously un-refrigerated due to a lack of plumbing to service such areas of conventional systems. The condensate removal system injects the condensate into the exhaust airflow, which may be exhausted to predetermined areas of the aircraft, such as non-humid areas of the aircraft. For example, the cabin of the aircraft may be dry and need the moist exhaust air to make the cabin more comfortable for the passengers.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An aircraft comprising: a cooling compartment; and an evaporative chiller configured to cool the cooling compartment, the evaporative chiller including a compressor, an evaporator configured to channel an airflow to the cooling compartment, and a condenser, the evaporative chiller having a condenser air circuit configured to produce an exhaust airflow to cool the condenser, the evaporative chiller having a condensate removal system configured to remove condensate produced by the evaporator using the exhaust airflow to discharge the condensate, the condensate removal system being a plumbing-free condensate removal system, wherein the plumbing-free condensate removal system does not include plumbing pipes for the condensate extending away from and coming into the evaporative chiller.

2. The aircraft of claim 1, wherein the condensate removal system is configured to inject the condensate into the exhaust airflow.

3. The aircraft of claim 1, wherein the exhaust air with the condensate is discharged to a predetermined location within the aircraft.

4. The aircraft of claim 3, wherein the exhaust air with the condensate is discharged into a cabin of the aircraft.

5. The aircraft of claim 3, wherein the exhaust air with the condensate is discharged into a cargo compartment of the aircraft.

6. The aircraft of claim 1, wherein the evaporative chiller is at least one of coupled to and positioned in a galley of the aircraft having the cooling compartment.

7. The aircraft of claim 6, wherein the galley is a plumbing-free galley.

8. The aircraft of claim 1, wherein the evaporative chiller is separate from a galley of the aircraft in one of a crown of the aircraft or a cargo compartment of the aircraft.

9. The aircraft of claim 1, wherein the cooling compartment and the evaporative chiller are in a crown of the aircraft.

10. The aircraft of claim 1, wherein the cooling compartment and the evaporative chiller are in a cargo compartment of the aircraft.

11. The aircraft of claim 1, wherein the evaporative chiller includes an air supply duct in flow communication with the cooling compartment to deliver the airflow to the cooling compartment, the condenser air circuit for air cooling the condenser, the condenser air circuit having a condenser supply duct and a condenser exhaust duct, the condenser having a condenser fan configured to promote airflow through the condenser air circuit from the condenser supply duct to the condenser exhaust duct, the condensate removal system configured to inject the condensate into the condenser exhaust duct to be expelled with the exhaust airflow.

12. The aircraft of claim 1, wherein the condensate removal system includes an atomizer nozzle configured to inject the condensate into the exhaust airflow.

13. The aircraft of claim 1, wherein the condensate removal system includes a sponge configured to evaporate the condensate into the exhaust airflow of the condenser air circuit.

14. The aircraft of claim 1, wherein the condenser includes a condenser fan configured to create the exhaust airflow, the condenser fan having blades, the condensate removal system including a condensate collector configured to hold the condensate proximate to the fan, the blades being dipped in the condensate in the condensate collector and propelled away from the blades to inject the condensate into the exhaust airflow.

15. An aircraft comprising: a galley having a plurality of stowage compartments, at least one of the stowage compartments defining a cooling compartment, the galley being plumbing-free; an evaporative chiller coupled to the galley, the evaporative chiller configured to cool the cooling compartment, the evaporative chiller including a compressor at the galley, an evaporator at the galley configured to channel an airflow to the cooling compartment for cooling the cooling compartment, and a condenser at the galley, the evaporative chiller having a condenser air circuit configured to produce an exhaust airflow to cool the condenser; and a plumbing-free condensate removal system coupled to the plumbing-free galley, the plumbing-free condensate removal system including a condensate collector configured to collect condensate produced by the evaporator, the plumbing-free condensate removal system including a condensate re-ingestor configured to discharge the condensate into the exhaust airflow such that the condensate is configured to be discharged from the evaporative chiller, wherein the plumbing-free condensate removal system does not include plumbing pipes for the condensate extending away from and coming into the evaporative chiller.

16. The aircraft of claim 15, wherein the plumbing-free condensate removal system is configured to inject the condensate into the exhaust airflow.

17. The aircraft of claim 15, wherein the exhaust air with the condensate is discharged to at least one of a cabin of the aircraft and a cargo compartment of the aircraft.

18. The aircraft of claim 15, wherein the evaporative chiller includes an air supply duct in flow communication with the cooling compartment to deliver the airflow to the cooling compartment, the condenser air circuit for air cooling the condenser, the condenser air circuit having a condenser supply duct and a condenser exhaust duct, the condenser having a condenser fan configured to promote airflow through the condenser air circuit from the condenser supply duct to the condenser exhaust duct, the plumbing-free condensate removal system configured to inject the condensate into the condenser exhaust duct to be expelled with the exhaust airflow.

19. A galley comprising: a plurality of walls configured to extend between a crown and a floor of a cabin of an aircraft; a cooling compartment defined by the plurality of walls, the cooling compartment being configured to receive at least one of a galley cart and a stowage container; and an evaporative chiller coupled to at least one of the walls of the galley and configured to cool the cooling compartment, the evaporative chiller including a compressor, an evaporator configured to channel an airflow to the cooling compartment, and a condenser, the evaporative chiller having a condenser air circuit configured to produce an exhaust airflow to cool the condenser, the evaporative chiller having a plumbing-free condensate removal system configured to remove condensate produced by the evaporator using the exhaust airflow to discharge the condensate, wherein the plumbing-free condensate removal system does not include plumbing pipes for the condensate extending away from and coming into the evaporative chiller.

* * * * *